(12) United States Patent
Vasisht et al.

(10) Patent No.: US 11,620,579 B2
(45) Date of Patent: Apr. 4, 2023

(54) GENERALIZED METRIC FOR MACHINE LEARNING MODEL EVALUATION FOR UNSUPERVISED CLASSIFICATION

(71) Applicant: INTUIT INC., Mountain View, CA (US)

(72) Inventors: Prajwal Prakash Vasisht, San Jose, CA (US); Nishanth Dara, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 319 days.

(21) Appl. No.: 16/925,218

(22) Filed: Jul. 9, 2020

(65) Prior Publication Data

US 2022/0012632 A1   Jan. 13, 2022

(51) Int. Cl.
  *G06Q 30/00* (2012.01)
  *G06N 20/00* (2019.01)
  *G06N 5/04* (2006.01)

(52) U.S. Cl.
  CPC .............. *G06N 20/00* (2019.01); *G06N 5/04* (2013.01)

(58) Field of Classification Search
  None
  See application file for complete search history.

(56) References Cited

U.S. PATENT DOCUMENTS

| | | | |
|---|---|---|---|
| 2020/0050965 A1* | 2/2020 | Harvill | G06N 5/04 |
| 2021/0073671 A1* | 3/2021 | Puri | G06N 20/00 |
| 2021/0105613 A1* | 4/2021 | San Miguel | H04W 12/63 |

* cited by examiner

*Primary Examiner* — Matthew T Sittner
(74) *Attorney, Agent, or Firm* — Patterson + Sheridan, LLP

(57) ABSTRACT

Certain aspects of the present disclosure provide techniques for generalized metric for machine learning model evaluation for unsupervised classification including: for each unsupervised machine learning model of one or more unsupervised machine learning models: generating a first set of synthetic inputs for the model of the one or more unsupervised machine learning models; providing the first set of synthetic inputs to the model trained to output a prediction for each input of the first set of synthetic inputs, wherein the prediction indicates whether the input is of a first class; identifying, based on an output of the model, a second set of synthetic inputs predicted to be of the first class; determining, based on a set of expected normal inputs for the model and the second set of synthetic inputs, an accuracy score for the unsupervised machine learning model; and providing the accuracy score for display.

14 Claims, 5 Drawing Sheets

GENERALIZED METRIC FOR MACHINE LEARNING MODEL EVALUATION FOR UNSUPERVISED CLASSIFICATION

INTRODUCTION

Aspects of the present disclosure relate to computationally efficient systems and methods for a generalized metric for machine learning model evaluation for unsupervised classification.

Generally, machine learning models are trained to provide an output for a set of inputs to the models. One type of a machine learning model is a supervised machine learning model. A supervised machine learning model may be generally trained with a dataset of labeled examples comprising inputs and their labels that may classify an input into a category (e.g., cat, not a cat). The output of the supervised machine learning model allows for an inference of the label for an input. The accuracy of such supervised machine learning models can be calculated based on how well the output of the model allows for the inference of the correct label. For example, the accuracy of a supervised machine learning model trained to predict whether an input is a cat or not can be calculated based on the number of times the model correctly predicts an input of a cat as a cat. The supervised machine learning model with highest accuracy is generally selected for a real-world application.

While problems with datasets of labeled examples can be solved using supervised machine learning models, not all problems can provide a model developer with labeled examples of data for training the supervised machine learning models. For such problems, a model developer may design an unsupervised machine learning model. However, due to the lack of labeled examples of data, evaluating the accuracy of the unsupervised machine learning model is challenging if not impossible. Thus, a model developer designing an unsupervised machine learning model may not be able to select a highly accurate unsupervised machine learning model for implementation in a real-world computing application.

Accordingly, what is needed are improved systems and techniques that efficiently and automatically evaluate unsupervised machine learning models.

BRIEF SUMMARY

Certain embodiments provide a method for a generalized metric for machine learning model evaluation for unsupervised classification. The method generally includes, for each unsupervised machine learning model of one or more unsupervised machine learning model, generating a first set of synthetic inputs for the unsupervised machine learning model of one or more unsupervised machine learning models. The method further includes, for each unsupervised machine learning model of one or more unsupervised machine learning model, providing the first set of synthetic inputs to the unsupervised machine learning model trained to output a prediction for each input of the first set of synthetic inputs, wherein the prediction indicates whether the input is of a first class of a plurality classes. The method further includes, for each unsupervised machine learning model of one or more unsupervised machine learning model, identifying, based on an output of the unsupervised machine learning model, a second set of synthetic inputs predicted to be of the first class. The method further includes, for each unsupervised machine learning model of one or more unsupervised machine learning model, determining, based on a set of expected normal inputs for the unsupervised machine learning model and the second set of synthetic inputs, an accuracy score for the unsupervised machine learning model. The method further includes, for each unsupervised machine learning model of one or more unsupervised machine learning model, providing the accuracy score for display to a requestor.

Certain embodiments provide a processing system, comprising: a memory comprising computer-executable instructions; a processor configured to execute the computer-executable instructions and cause the processing system to: for each unsupervised machine learning model of one or more unsupervised machine learning models: generate a first set of synthetic inputs for the unsupervised machine learning model of one or more unsupervised machine learning models; provide the first set of synthetic inputs to the unsupervised machine learning model trained to output a prediction for each input of the first set of synthetic inputs, wherein the prediction indicates whether the input is of a first class of a plurality of classes; identify, based on an output of the unsupervised machine learning model, a second set of synthetic inputs predicted to be of the first class; determine, based on a set of expected normal inputs for the unsupervised machine learning model and the second set of synthetic inputs, an accuracy score for the unsupervised machine learning model; and providing the accuracy score for display to a requestor.

Certain embodiments provide a non-transitory computer-readable medium comprising computer-executable instructions, which, when executed by a processing system, cause the processing system to perform a method for generating a first set of synthetic inputs for the unsupervised machine learning model of one or more unsupervised machine learning models; providing the first set of synthetic inputs to the unsupervised machine learning model trained to output a prediction for each input of the first set of synthetic inputs, wherein the prediction indicates whether the input is of a first class of a plurality of classes; identifying, based on an output of the unsupervised machine learning model, a second set of synthetic inputs predicted to be of the first class; determining, based on a set of expected normal inputs for the unsupervised machine learning model and the second set of synthetic inputs, an accuracy score for the unsupervised machine learning model; and providing the accuracy score for display to a requestor.

Certain embodiments provide a method, comprising: receiving a plurality of unsupervised machine learning models from a requestor, wherein each unsupervised machine learning model of the plurality of unsupervised machine learning models is trained to output a prediction of whether an input to the unsupervised machine learning model is an anomalous time entry or not an anomalous time entry; for each unsupervised machine learning model of the plurality of unsupervised machine learning models: generating a first set of synthetic inputs for the unsupervised machine learning model; providing the first set of synthetic inputs to the unsupervised machine learning model; identifying, based on an output of the unsupervised machine learning model, a second set of synthetic inputs predicted to be not anomalous time entries; determining, based on a set of expected normal inputs for the unsupervised machine learning model and the second set of synthetic inputs, an accuracy score for the unsupervised machine learning model; and providing the accuracy score for display to the requestor.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
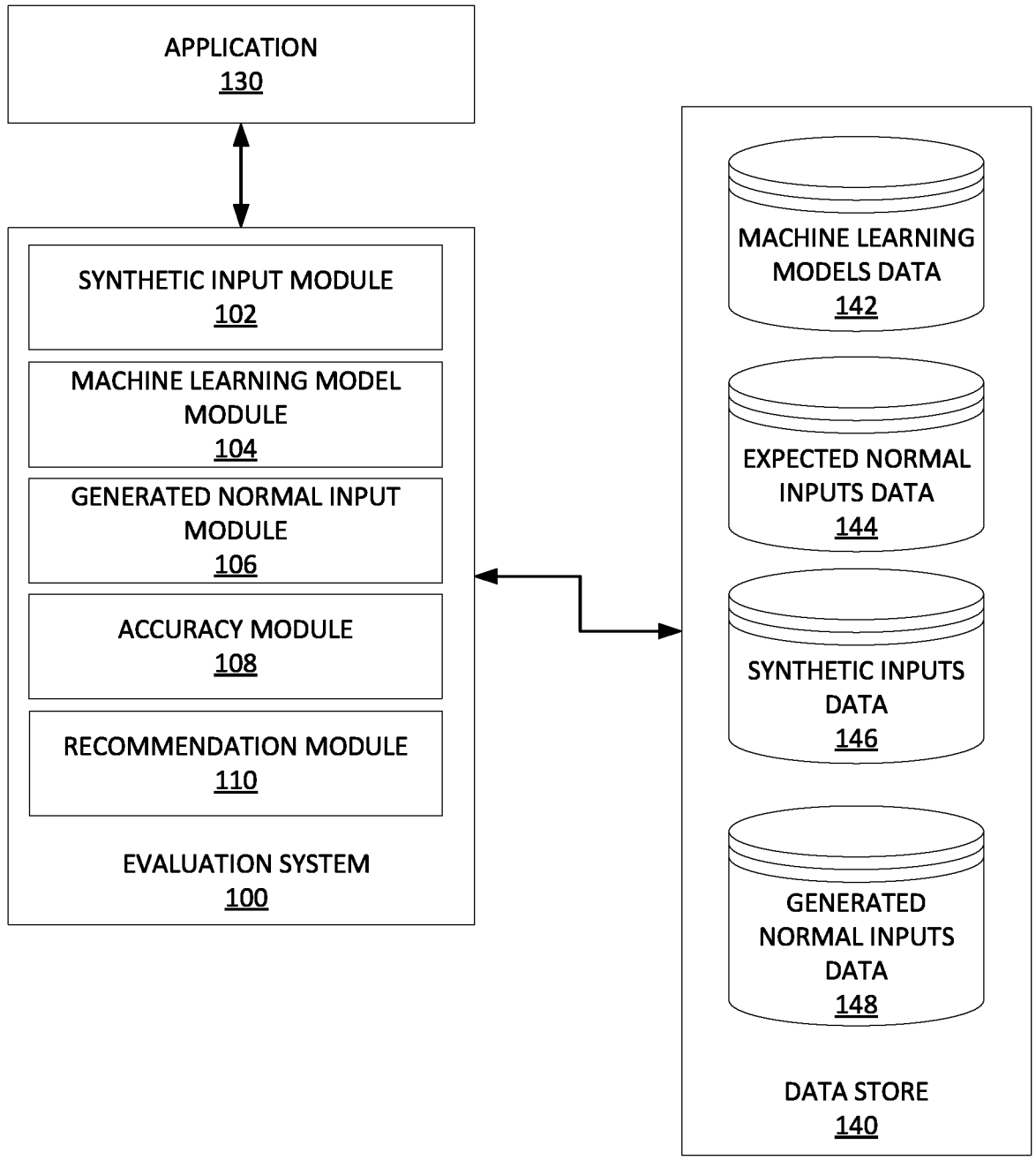
FIG. 1 depicts an example system for generalized metric for machine learning model evaluation for unsupervised classification, in accordance with certain embodiments of the present disclosure.

Aspects of the present disclosure provide apparatuses, methods, processing systems, and computer readable mediums for generating a generalized metric for machine learning model evaluation for unsupervised classification.

Unsupervised machine learning models are generally selected when problems that a user (e.g., a machine learning model developer, a machine learning model designer, and the like) is trying to solve do not have data with labeled examples. For example, suppose an organization desires to implement an intelligent payroll approval computing system that automatically approves payroll for its hourly wage employees. To ensure that the intelligent payroll approval computing system is robust enough to satisfactorily approve only valid entries of the hours worked by the hourly wage employees and detect anomalous entries that should be disapproved and/or flagged, the organization may desire to implement a machine learning model trained to predict whether an entry indicating the number of hours worked by an employee is a valid entry or an invalid entry. The organization may not have a sufficient number of examples of invalid entries to train a supervised machine learning model to predict whether an input indicating a number of hours worked is a valid or an invalid entry. Therefore, the organization may implement an unsupervised machine learning model.

Continuing with the above example, a user or a team of users may generally develop multiple unsupervised machine learning models to address the problem of automatically approving the payroll entries and select the most accurate and/or computationally efficient unsupervised machine learning model from the multiple unsupervised machine learning models. However, because the dataset for unsupervised machine learning models do not include labeled examples, it is difficult and time consuming to identify the most accurate and/or computationally efficient unsupervised machine learning model. For example, a user(s) may have to manually run several experiments with each of the multiple unsupervised machine learning models and, for each of the multiple unsupervised machine learning models, compare the outputs for some inputs to determine whether the outputs match expected labels for those inputs.

Additionally, such a manual process may fail to generate sufficient variation of inputs to sufficiently test the model and to determine robustness and consistency of the model in accurately predicting a label for the input. Consequently, such a process fails the user(s) in identifying the most accurate unsupervised machine learning model, and prevents accurate tuning of the hyperparameters of the unsupervised machine learning model, which may result in a suboptimal performance of the machine learning model and suboptimal performance of the computing system implementing this machine learning model.

Furthermore, the above described manual process may be very dependent on a particular model and feasible only for certain use cases and inputs. For a different unsupervised machine learning model and/or a different use case and/or inputs, a different manual process for evaluating the model may have to be designed and followed. Such variations in the processes to evaluate the models will consume additional time resources and introduce errors into the evaluation process that may affect the accuracy determination of the various models.

Accordingly, there is a need for systems and techniques that automatically evaluate an unsupervised machine learning model and provide accuracy information of the model to a user allow the user to correctly identify the accurate model for implementation.

The systems and techniques described herein are configured to provide an automated process of evaluating an unsupervised machine learning model using a generalized metric that is independent of any use-specific unsupervised machine learning model design and/or use cases of the model. The systems and techniques described herein may be configured to generate a set of synthetic inputs for each unsupervised machine learning model being evaluated, and provide the corresponding set of synthetic inputs to the corresponding unsupervised machine learning model. The systems and techniques described herein may be configured to identify the synthetic inputs predicted to be not anomalous. Based on a generalized metric, synthetic inputs predicted to be not anomalous, and a set of expected normal inputs, the systems and techniques described herein may be configured to determine an accuracy score for the unsupervised machine learning model, and provide the accuracy score for display to a user.

The accuracy scores allow a user to rapidly identify and select the most accurate unsupervised machine learning model of the different unsupervised machine learning models. The user may further tune the hyperparameters of the selected machine learning model to adjust its performance and, using the systems and techniques described herein, compare accuracy of the different versions of the selected machine learning model to select the most accurate and best performing model for implementation in a computing system. As described herein, hyperparameters of a machine learning model may be parameters whose values affect the speed and quality of the learning process of the model. Therefore, tuning of the values of the hyperparameters of the machine learning model may improve the speed and/or quality of the learning process of the machine learning model. Thus, the systems and techniques described herein provide enhanced methods for training unsupervised machine learning models, and improve accuracy and performance of computing systems implementing the unsupervised machine learning models.

Brief Overview of Machine Learning

The systems and methods described herein may be used for evaluating machine learning models during a model design and training phase.

Machine learning is generally an application of artificial intelligence (AI) that enables processing systems to automatically learn and improve from exposure to data without being explicitly programmed. The process of "learning" relies on processing data (e.g., "observations") with machine learning algorithms to find, for example, patterns that may be otherwise undiscernible by normal inspection. Machine learning algorithms thus allow processing systems to learn without human intervention or assistance. Machine learning algorithms are often categorized as supervised or unsupervised.

Supervised machine learning algorithms generally analyze training data with known target or output values (e.g., labels) in order to determine a function that may be subsequently used to make predictions (or "inferences") based on new, unlabeled data. To learn, such algorithms may compare the predicted output of the predictive function with the known output of training data to evolve the predictive function in such a way that prediction error is eventually minimized.

Unsupervised machine learning algorithms generally analyze training data without labels. Thus, unsupervised learning generally determines a function to describe latent structure in unlabeled training data. For example, unsupervised machine learning algorithms may generate clusters of data, decision boundaries between subsets of data, and the like.

Semi-supervised machine learning algorithms generally use both labeled and unlabeled data for training, which may typically involve a relatively smaller amount of labeled data and a relatively larger amount of unlabeled data. The labeled data generally improves learning accuracy as compared to unsupervised technique.

Reinforcement machine learning algorithms generally involves interacting with a specific environment through "actions" and discovering errors or rewards through those interactions. Reinforcement algorithms thus allow processing systems to automatically determine an ideal behavior within a specific context in order to maximize its performance. Feedback, which may be considered a reinforcement signal, is generally required for the reinforcement algorithms to learn which action is best.

Machine learning thus enables analysis of large quantities of data to generate models for myriad purposes. The embodiments described herein generally refer to supervised learning techniques, but other machine learning techniques may be possible in other embodiments.

Synthetic Inputs

A synthetic input, as described herein, refers to a test input generated by the systems and techniques described herein. A set of synthetic inputs may be provided as inputs to an unsupervised machine learning model evaluated by the systems and techniques described herein. Values of these generated sets of synthetic inputs may be distributed over a large range of values. Using a large range of values to test an unsupervised machine learning model allows for the model to be evaluated at various boundary input cases. Thus, evaluating the unsupervised machine learning models using the synthetic inputs allows for a more robust evaluation of the model and improves accuracy of the accuracy scores determined by the systems and techniques described herein.

A synthetic input may generally be represented as a feature vector or tensor. The values of the set of synthetic inputs may be all the possible values that can be provided as inputs to an unsupervised machine learning model that is being evaluated by the systems described herein. For example, values of a set of synthetic inputs may be a combination of all possible values of every single input feature of input feature vector for an unsupervised machine learning model.

A user may provide a range of input values that can be provided to an unsupervised machine learning model being evaluated by the systems described herein. For example, a user may provide a range of values for each feature of a feature vector for an unsupervised machine learning model being evaluated by the systems described herein. The set of synthetic inputs may be generated such that the values of the set of synthetic inputs may be based on the range of input values provided by the user. A set of synthetic inputs for an unsupervised machine learning model may be generated based on the features and/or feature vectors that the unsupervised machine learning model is configured to receive. A different set of synthetic inputs may be generated for each unsupervised machine learning model evaluated by the systems and techniques described herein. In some implementations, each different set of synthetic inputs may have different distribution of values for input features.

Expected Normal Inputs

Expected normal inputs, as described herein, are inputs to a trained unsupervised machine learning model for which a user developing the model expects the corresponding predicted labels and/or classification by the unsupervised machine learning model to be a certain label and/or classification. For example, for a machine learning model trained to output predictions of whether an input of weekly hours worked by an employee is an anomaly or not an anomaly (i.e., normal), the expected normal inputs may be a range of weekly hours that the user developing the unsupervised machine learning model expects to predicted as not anomalies.

The expected normal inputs may be inputs that are guided by an intuition of a user developing the unsupervised machine learning model. In some implementations, the expected normal inputs may be inputs that are determined to be of a certain class (e.g., not anomalous) of multiple classes (e.g., anomalous, not anomalous, and the like). The user may provide the expected normal inputs to the systems described herein. In some implementations, the expected normal inputs may be provided as input feature vectors. On or more values of the synthetic inputs may include one or more values of the expected normal inputs.

Generated Normal Inputs

Generated normal inputs, as described herein, are synthetic inputs to a trained unsupervised machine learning model that are predicted by the unsupervised machine learning model to be not anomalous. The values of the generated normal inputs may be the same as expected normal inputs. For example, if an unsupervised machine learning model trained to predict anomalies of weekly worked hours is configured to predict inputs of hours between 35-45 hours as not anomalous, then the values of the synthetic inputs predicted by the model to be not anomalous may be between 35-45.

Generalized Metric for Accuracy Evaluation

The accuracy of an unsupervised machine learning model may be determined by a generalized metric based on an area of overlap between the expected normal inputs and generated normal inputs, and an area of union between the expected normal inputs and generated normal inputs. The generalized metric may be expressed by equation 1 below:

$$\frac{\text{size (expected normal inputs} \cap \text{generated normal inputs)}}{\text{size (expected normal inputs} \cap \text{generated normal inputs)}} \quad (\text{EQ. 1})$$

where expected normal inputs∩generated normal inputs is the intersection between the expected normal inputs and the generated normal inputs, size (expected normal inputs∩generated normal inputs) indicates a number of common inputs between the set of expected normal inputs and the set of generated normal inputs or an area of overlap between the set of expected normal inputs and the set of generated normal inputs, expected normal inputs∪generated normal inputs is a union between expected normal inputs and generated normal inputs, and size (expected normal inputs∪generated normal inputs) indicates a total number of distinct inputs between the set of expected normal inputs and generated normal inputs or an area of union between the set of expected normal inputs and the set of generated normal inputs.

For example, if a set of expected normal inputs for an unsupervised machine learning model is [3, 4, 5, 6], a set of synthetic input for the unsupervised machine learning model is [1, 2, 3, 4, 5, 6, 7] and the set of generated normal inputs is [3, 4, 5], then the accuracy of the unsupervised machine learning model using the generalized metric can be calculated as following:

$$\frac{\text{size ([3, 4, 5, 6]} \cap \text{[3, 4, 5])}}{\text{size ([3, 4, 5, 6]} \cup \text{[3, 4, 5])}} \rightarrow \quad (1)$$

$$\frac{\text{size ([3, 4, 5])}}{\text{size ([3, 4, 5, 6])}} \rightarrow \quad (2)$$

$$\frac{3}{4} \rightarrow \quad (3)$$

$$0.75. \quad (4)$$

Thus, the accuracy of the unsupervised machine learning model in the example is 0.75. The values of the generalized metric may generally be between 0 and 1.

Using the value generated by the generalized metric, the systems and techniques described herein may determine an accuracy of the trained unsupervised machine learning model, and, based on the determined accuracies, the systems and techniques described herein may recommend an unsupervised machine learning model of the multiple unsupervised machine learning models to a user. Accordingly, the methods and systems described herein improve the training and selection of machine learning models as compared to conventional ad-hoc evaluation methods for unsupervised models.

Figure 2:
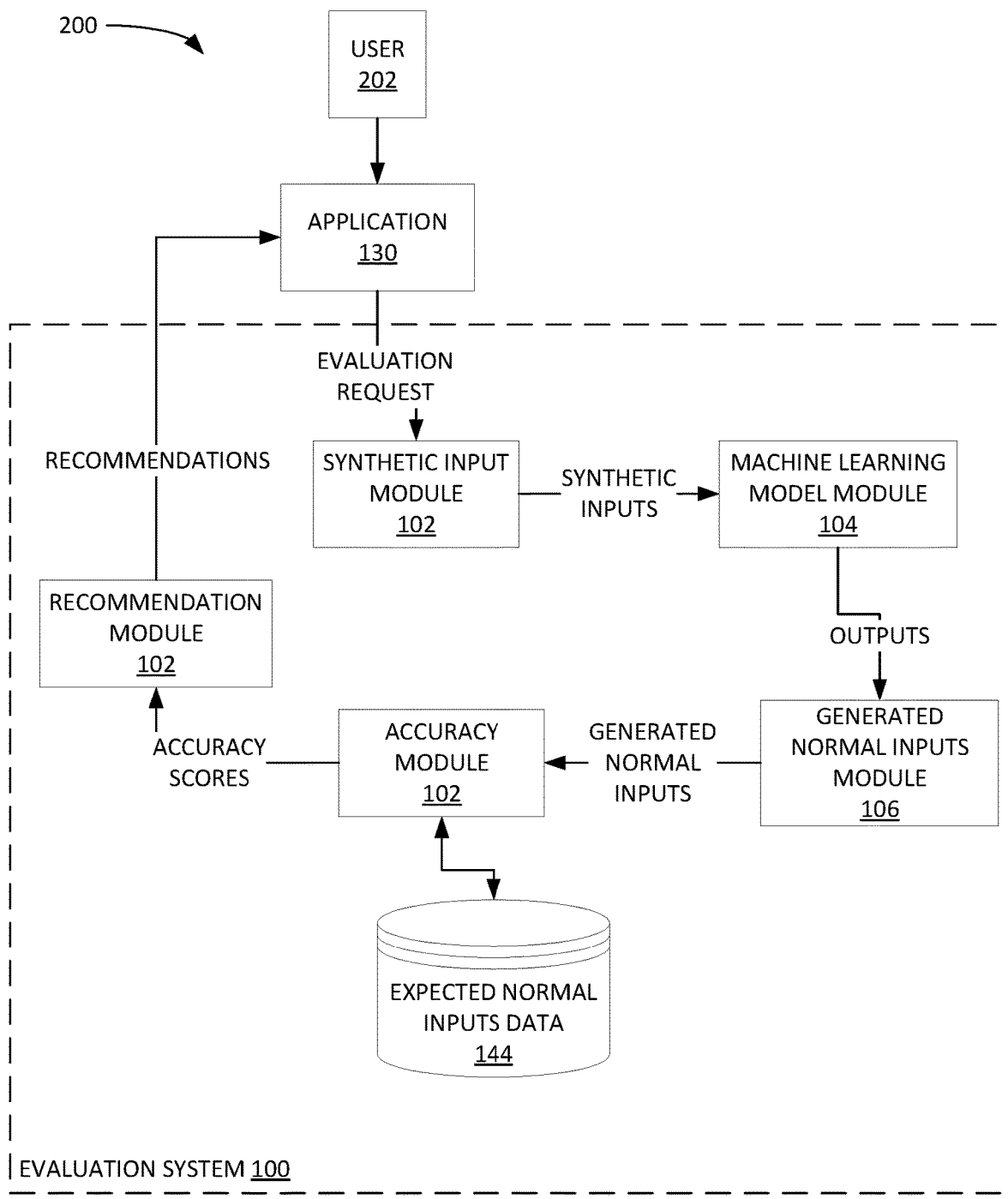
FIG. 2 depicts an example process flow for generalized metric for machine learning model evaluation for unsupervised classification, in accordance with certain embodiments of the present disclosure.
Figure 3:
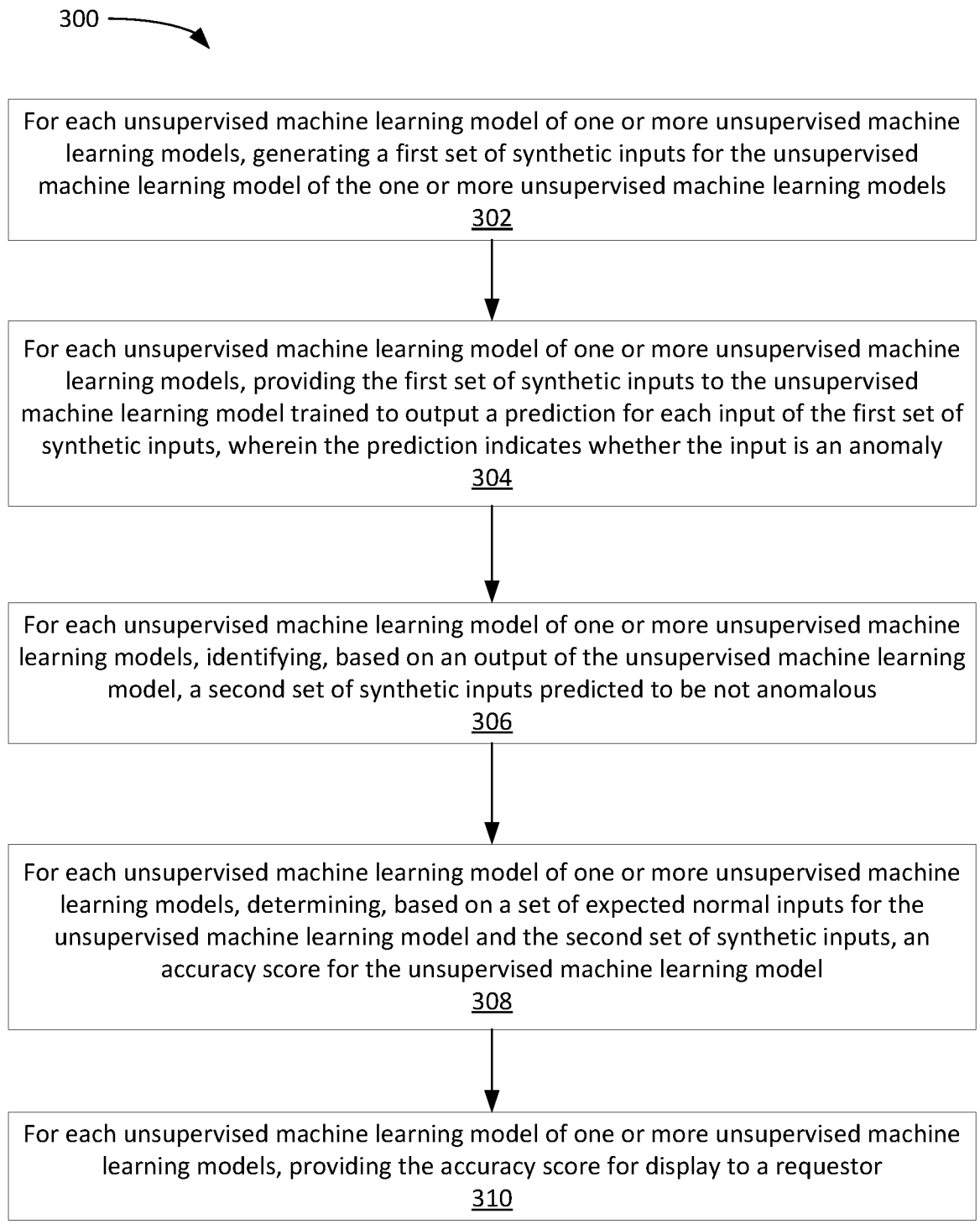
FIG. 3 depicts an example method for evaluating unsupervised machine learning models, in accordance with certain embodiments of the present disclosure.

Additional details of evaluating an unsupervised machine learning model using the generalized metric are described herein with reference to FIGS. 1-3.

Example System for Evaluating Unsupervised Machine Learning Models

FIG. 1 depicts an example evaluation system 100 for evaluating one or more unsupervised machine learning models. As shown in FIG. 1, the evaluation system 100 may be communicatively coupled to an application 130, and a data store 140. The evaluation system 100 includes a synthetic input module 102, a machine learning model module 104, a generated normal input module 106, an accuracy module 108, and a recommendation module 110.

The evaluation system 100 may receive one or more unsupervised machine learning models for evaluation via application 130 from a requestor (e.g., a user, an application used by the requestor, and the like). In some implementations, the evaluation system 100 may receive machine readable instructions (e.g., compiled binary package and/or file) for each of the one or more unsupervised machine learning models. The one or more unsupervised machine learning models may be trained unsupervised machine learning models. For each unsupervised machine learning model, the requestor may provide a set of expected normal inputs to the model, and a range of values for each feature of a set of input features to the unsupervised machine learning model. In some implementations, the requestor may provide a size of a dimension of each input to one or more unsupervised machine learning model(s). For example, a requestor may provide that dimension size of inputs to an unsupervised machine learning model may be 20,000.

The synthetic input module 102 may generate a set of synthetic inputs for each unsupervised machine learning model received from the requestor for evaluation. For example, if three unsupervised machine learning models are received for evaluation, then the synthetic input module 102 may generate three sets of synthetic inputs, one for each unsupervised machine learning model. The synthetic input module 102 may generate the sets of synthetic inputs based on the range of values of each feature provided by the requestor. The synthetic input module 102 may generate the synthetic inputs in such a manner that the dimension of each synthetic input may be of the same size as an expected normal input to the corresponding unsupervised machine learning model. As described above, the values of the synthetic inputs may be based on the range of input values of each feature provided by the requestor and values of the set of synthetic inputs may be a combination of all possible values of every single input feature to the machine learning model.

The machine learning model module 104 may execute and/or process each unsupervised machine learning model received from the requestor for evaluation. For each unsupervised machine learning model, the machine learning model module 104 may provide the corresponding set of synthetic inputs generated by the synthetic module 102 as inputs to the unsupervised machine learning model. The unsupervised machine learning models may be trained to output a prediction for each input, where the prediction indicates whether the input is of a first class of multiple classes (e.g., anomalous input, not an anomalous input, and the like). In some implementations, the machine learning model module 104 may store the outputs of each of the executed and/or processed unsupervised machine learning models in data store 140.

The generated normal input module 106, for each executed and/or processed unsupervised machine learning model, may identify every synthetic input predicted by the unsupervised machine learning model to be not of a first class of the multiple classes. The generated normal input module 106 may identify the synthetic input(s) predicted by the unsupervised machine learning model to be not anomalous based on the outputs of the unsupervised machine learning model. For example, an unsupervised machine learning model may predict that one input out of the ten inputs is not anomalous, and the generated normal input module 106 may identify that one input as a generated normal input. A set of generated normal inputs of an unsupervised machine learning model may be a subset of a set of synthetic inputs provided to the machine learning model.

The accuracy module 108 may determine an accuracy score for each unsupervised machine learning model executed and/or processed by the machine learning model module 104. The accuracy module 108 may determine the accuracy score for each unsupervised machine learning model based on the corresponding set of expected normal inputs, the corresponding set of generated normal inputs, and the generalized metric of Equation 1, described above. The accuracy module 108 may store the determined accuracy score of each unsupervised machine learning model in the data store 140. The accuracy module 108 may store the determined accuracy score in association with an identifier of the unsupervised machine learning model.

The recommendation module 110 may provide the one or more accuracy scores for display to the requestor. In some implementations, the recommendation module 110 displays each accuracy score along with an identifier (e.g., a name, unique number, and the like) of the corresponding unsupervised machine learning model. In some implementations, the recommendation module 110 may select one or more unsupervised machine learning models of all the unsupervised machine learning models as the most accurate models based on the accuracy scores of the unsupervised machine learning models. For example, the recommendation module 110 may compare the determined accuracy scores and select the one or more unsupervised machine learning models with the highest accuracy score. The selected one or more unsupervised machine learning models may be deployed into a production environment (e.g., a real-world application). For example, a user may deploy an unsupervised machine learning model selected by the recommendation module 110 to be implemented in a real-world application.

The data store 140 may store machine learning models data 142, expected normal inputs data 144, synthetic inputs data 146, generated normal inputs data 148, and the like. The machine learning models data 142 may include the one or more machine learning models received from the requestor. For example, the machine learning models data 142 may include machine readable instructions, such as a compiled binary package and/or a file, of each unsupervised machine learning model received. In some implementations, the machine learning models data 142 may include a range of values for each feature of inputs to the corresponding machine learning model. The expected normal inputs data 144 may include a set of expected normal inputs received from a requestor for each of the unsupervised machine learning model received from the requestor. The synthetic inputs data 146 may include sets of synthetic inputs generated by the synthetic input module 102. The generated normal inputs data 148 may include sets of generated normal inputs identified by the generated normal input module 106.

The application 130 may be any sort of application, such as a desktop application, web-based application, mobile device application, and the like. In some examples, application 130 may be an application configured to receive one or more unsupervised machine learning models from a user. The application 130 may be configured display to a user, a corresponding accuracy score determined by the evaluation system 100 for the one or more unsupervised machine learning models. The application 130 may be configured with one or more user interfaces (UIs) to register objectives and request execution of the objectives.

Note that while FIG. 1 does not depict any specific network or networks, one or more networks, such as local area networks (LANs), wide area networks (WANs), and the like, may connect hierarchical optimization system 100 with the data store 140 and the application 130, and likewise the data store 140 with the application 130.

Example Process Flow for Evaluating Unsupervised Machine Learning Models

FIG. 2 depicts an example process flow 200 for evaluating unsupervised machine learning models with evaluation system 100.

Process flow 200 starts at 202 where a user interacts with an application 130 to transmit a request to evaluate one or more unsupervised machine learning models using the evaluation system 100. The user interacts with the application 130 to provide information related to range of values of each feature of inputs to each of the one or more unsupervised machine learning models, and a set of expected normal inputs for each of the one or more unsupervised machine learning models.

The application 130 may transmit the request to evaluate the one or more unsupervised machine learning models along with corresponding range of values of each feature of inputs, and/or corresponding set of expected normal inputs to the unsupervised machine learning models.

For each unsupervised machine learning model received from the requestor via the application 130, the synthetic input module 102 generates a set of synthetic inputs. As described above, the synthetic input module 102 may generate the set of synthetic inputs based on the range of values of each feature of input received from the requestor. The sets of synthetic inputs may be provided to the machine learning models module 104.

The machine learning models module 104 may provide each set of synthetic inputs to the corresponding unsupervised machine learning model and executed and/or process the unsupervised machine learning model. For each of the synthetic inputs to the corresponding unsupervised machine learning models, the corresponding output of the corresponding unsupervised machine learning model predict whether the synthetic input is anomalous or not anomalous. The outputs of the unsupervised machine learning models are provided to the generated normal input module 106.

For each unsupervised machine learning model, the generated normal input module 106, based on the received outputs of the unsupervised machine learning models, may identify the synthetic inputs predicted to be not anomalous as generated normal inputs. The generated normal input module 106 may provide the generated normal inputs to the accuracy module 108.

As described above, the accuracy module 108 may determine an accuracy score for each unsupervised machine learning model based on the corresponding set of expected normal inputs, the corresponding set of generated normal inputs, and the generalized metric of equation 1 described above. In some implementations, for each unsupervised machine learning model, the accuracy module 108 may retrieve a corresponding set of expected normal inputs from data store 140. The determined accuracy scores are provided to the recommendation module 110.

The recommendation module 110 may compare the received accuracy scores and select the one or more corresponding unsupervised machine learning models with the highest accuracy scores as the most accurate unsupervised machine learning models. The recommendation module 110 may provide the selected one or more unsupervised machine learning models, along with corresponding accuracy scores, for display to a user. In some implementations, the recommendation module 110 may provide for display to a user the accuracy scores of all unsupervised machine learning models.

Example Method of Evaluating Unsupervised Machine Learning Models

FIG. 3 depicts an example method 300 of evaluating unsupervised machine learning models.

Method 300 begin at step 302 with, for each unsupervised machine learning model of one or more unsupervised machine learning models, generating (e.g., via synthetic input module 102) a first set of synthetic inputs for the unsupervised machine learning model of the one or more unsupervised machine learning models.

Method 300 then proceeds to step 304 with, for each unsupervised machine learning model of one or more unsupervised machine learning models, providing (e.g., via machine learning model module 104) the first set of synthetic inputs to the unsupervised machine learning model trained to output a prediction for each input of the first set of synthetic inputs, wherein the prediction indicates whether the input is of a first class of a plurality of classes (e.g., anomalous input, not an anomalous input, and the like).

Method 300 then proceeds to step 306, for each unsupervised machine learning model of one or more unsupervised machine learning models, identifying (e.g., generated normal input module 106), based on an output of the unsupervised machine learning model, a second set of synthetic inputs (e.g., generated normal inputs) predicted to be of the first class (e.g., not an anomalous input).

Method 300 then proceeds to step 308, for each unsupervised machine learning model of one or more unsupervised machine learning models, determining (e.g., via accuracy module 108), based on a set of expected normal inputs for the unsupervised machine learning model and the second set of synthetic inputs, an accuracy score for the unsupervised machine learning model.

Method 300 then proceeds to step 310, for each unsupervised machine learning model of one or more unsupervised machine learning models, providing (e.g., via recommendation module 110) the accuracy score for display to a requestor (e.g., a user, an application used by a user, and the like).

In some implementations, in determining the accuracy score, the method 300 comprises determining, based on the set of expected normal inputs and the second set of synthetic inputs, an area of overlap between the set of expected normal inputs and the second set of synthetic inputs (e.g., generated normal inputs of FIG. 1 and FIG. 2), such as described above with respect to FIGS. 1 and 2. For example, the area of overlap between the set of expected normal inputs and second set of synthetic inputs may be determined based on size (expected normal inputs ∩ generated normal inputs) of equation 1 as described above.

In some implementations, in determining the accuracy score, the method 300 comprises determining, based on the set of expected normal inputs and the second set of synthetic inputs (e.g., generated normal inputs of FIG. 1 and FIG. 2), an area of union between the set of expected normal inputs and the second set of synthetic inputs, such as described above with respect to FIGS. 1 and 2. For example, the area of union between the set of expected normal inputs and second set of synthetic inputs may be determined based on size (expected normal inputs ∪ generated normal inputs) of equation 1 as described above. In some implementations, in determining the accuracy score, the method 300 further comprises determining a number of unique common inputs between the set of expected normal inputs and the second set of synthetic inputs, and determining a total number of unique common inputs between the set of expected normal inputs and the second set of synthetic inputs, such as described above with respect to FIGS. 1 and 2.

In some implementations, the second set of synthetic inputs (e.g., generated normal inputs) are a subset of the first set of synthetic inputs. In some implementations, the method 300 further comprises selecting, based on the corresponding accuracy scores of the one or more unsupervised machine learning models, a first unsupervised machine learning model of the one or more machine learning models for deployment into a production environment, such as described above with respect to FIGS. 1 and 2.

In some implementations, the accuracy score of the first unsupervised machine learning model is greater than the corresponding accuracy scores of the other one or more machine learning models, such as described above with respect to FIGS. 1 and 2. In some implementations, the expected set of normal inputs are received from the requestor, such as described above with respect to FIGS. 1 and 2. In some implementations, the one or more unsupervised machine learning models are received from the requestor, such as described above with respect to FIGS. 1 and 2.

Figure 4:
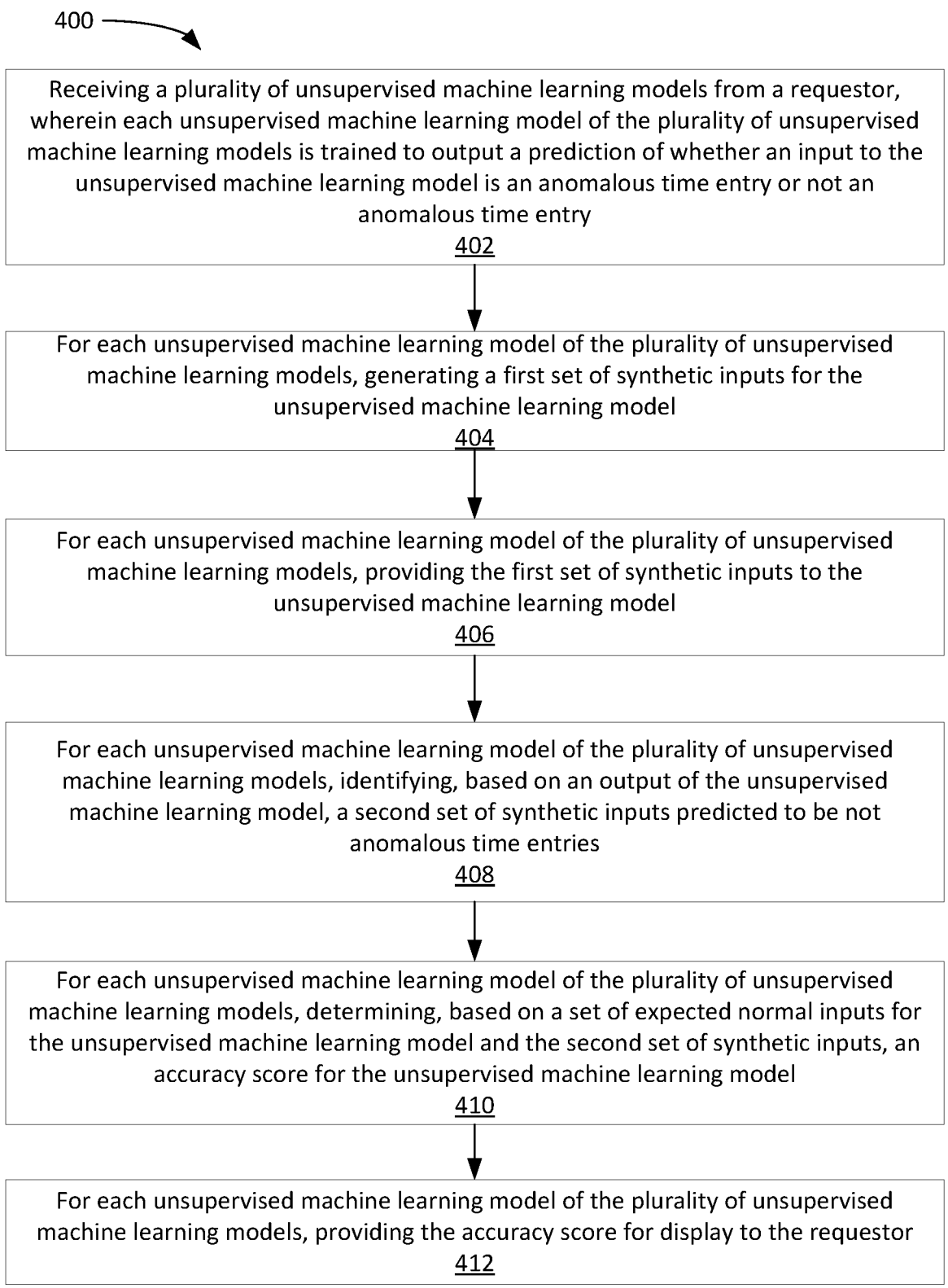
FIG. 4 depicts an example method for evaluating unsupervised machine learning models for an example application, in accordance with certain embodiments of the present disclosure.

Example Method for Evaluating Unsupervised Machine Learning Models for an Example Application FIG. 4 depicts an example method 400 for evaluating unsupervised machine learning models for an example application with evaluation system 100. For the purpose of illustrating a clear example, the unsupervised machine learning models described in the example process 400 are evaluated for implementation in a real-world time approval application. The unsupervised machine learning models described herein with respect to FIG. 4 are configured to receive weekly time entries as inputs, and are trained to predict whether an input is an anomalous time entry or not an anomalous time entry.

Method 400 begins at step 402 with, receiving a plurality of unsupervised machine learning models from a requestor, wherein each unsupervised machine learning model of the plurality of unsupervised machine learning models is trained to output a prediction of whether an input to the unsupervised machine learning model is an anomalous time entry or not an anomalous time entry.

As described above, a user may interact with the application 130 to transmit a request to evaluate one or more (e.g., three) unsupervised machine learning models using the evaluation system 100. In some implementations, the user may transmit, via application 130, the one or more unsupervised machine learning models for evaluation. In some implementations, the user may transmit the one or more machine learning models for evaluation by transmitting a corresponding set of machine readable instructions for each unsupervised machine learning model. For example, a user may transmit the one or more machine learning models for evaluation to the evaluation system 100 by transmitting a corresponding compiled binary package and/or file for each unsupervised machine learning model to the evaluation system 100.

For each unsupervised machine learning model being evaluated, the user may transmit a range of values for the one or more inputs to the model. For example, the user may transmit that the range of values for time entry inputs to an unsupervised machine learning model may be between the values 0.01 hours and 100 hours. For each unsupervised machine learning model being evaluated, the user may transmit a set of expected normal inputs. For example, the user may transmit a set of inputs [35, 38, 40, 42, 45] expected normal inputs of weekly hours for each of the unsupervised machine learning models.

Method 400 then proceeds to step 404 with, for each unsupervised machine learning model of the plurality of unsupervised machine learning models, generating (e.g., via the synthetic input module 102) a first set of synthetic inputs for the unsupervised machine learning model. For each unsupervised machine learning model, based on the corresponding range of values for the inputs provided by the user, the synthetic input module 102 may generate a set of synthetic inputs. For example, for the range of values for time entry inputs between 1 hour and 100 hours, the synthetic input module 102 may generate 10,000 synthetic inputs of values ranging between 0.01 hours and 100 hours, where the first synthetic input is 0.01 hours, the second synthetic input is 0.02, hours, the third synthetic input is 0.03 hours, and so on until the $10,000^{th}$ input of 100 hours.

Method 400 then proceeds to step 406 with, for each unsupervised machine learning model of the plurality of unsupervised machine learning models, providing (e.g., the machine learning model module 104) the first set of synthetic inputs to the unsupervised machine learning model. For each unsupervised machine learning model, the machine learning model module 104 provides a corresponding set of synthetic inputs to the unsupervised machine learning model. As described above, the unsupervised machine learning models being evaluated in the example method of FIG. 4, are models trained to output a prediction of whether an input to the model is an anomalous weekly time entry or not an anomalous weekly time entry. In this example of FIG. 4, for each synthetic input of the set of 10,000 synthetic inputs, each unsupervised machine learning model outputs a prediction of whether the synthetic input is an anomalous time entry or not an anomalous time entry.

Method 400 then proceeds to step 408 with, for each unsupervised machine learning model of the plurality of unsupervised machine learning models, identifying, based on an output of the unsupervised machine learning model, a second set of synthetic inputs predicted to be not anomalous time entries. In the example of FIG. 4, the generated normal inputs module 106, for each of the unsupervised machine learning model, may identify each of the corresponding synthetic inputs predicted as not an anomalous time entry as a generated normal input.

For example, if a first unsupervised machine learning model identifies synthetic inputs of 38 hours, 40 hours, and 42 hours as not anomalous time entries, then the generated normal inputs module 106 may identify the synthetic inputs of 38, 40, and 42 hours as generated normal inputs for the first unsupervised machine learning model. Similarly, if a second unsupervised machine learning model identifies synthetic inputs of 35 hours, 38 hours, and 40 hours as not anomalous time entries, then the generated normal inputs module 106 may identify the synthetic inputs of 35, 38, and 40 hours as generated normal inputs for the second unsupervised machine learning model. And if a third unsupervised machine learning model identifies synthetic inputs of 35 hours, 38 hours, 40 hours, and 42 hours as not anomalous time entries, then the generated normal inputs module 106 may identify the synthetic inputs of 35, 38, 40, and 42 hours as generated normal inputs for the third unsupervised machine learning model.

Method 400 then proceeds to step 410 with, for each unsupervised machine learning model of the plurality of unsupervised machine learning models, determining, based on a set of expected normal inputs for the unsupervised machine learning model and the second set of synthetic inputs, an accuracy score for the unsupervised machine learning model. The accuracy module 108, for each unsupervised machine learning model, generates an accuracy based on the set of expected normal inputs, the set of generated normal inputs, and the generalized metric of equation 1 described above. In the example of FIG. 4, the accuracy module 108 may generate an accuracy score of 0.6 for the first unsupervised machine learning model, an accuracy score of 0.6 for the second unsupervised machine learning model, and an accuracy score of 0.8 for the third unsupervised machine learning model.

Method 400 then proceeds to step 412 with, for each unsupervised machine learning model of the plurality of unsupervised machine learning models, providing (e.g., via recommendation module 110) the accuracy score for display to the requestor. Based on the accuracy scores, the recommendation module 110 determines and/or selects one or more unsupervised machine learning models as the most accurate. In the example of FIG. 4, the recommendation module 110 determines and/or selects the third unsupervised machine learning model as the most accurate unsupervised machine learning model of the three unsupervised machine learning models being evaluated. The evaluation system 100, via the recommendation module 110, may cause the selected model to be implemented by the real-world time approval application. In the example of FIG. 4, the evaluation system 100, via the recommendation module 110 may cause the selected third unsupervised machine learning model to be implemented by the real-world time approval application.

In some implementations, the evaluation system 100, via the recommendation module 110, may cause the selected unsupervised machine learning model to be further enhanced by tuning of the hyperparameters. For example, a user may tune the hyperparameters to improve the speed and/or quality of the learning process of the selected unsupervised machine learning model. In the example of FIG. 4, the evaluation system 100 may cause selected third unsupervised machine learning model to be further enhanced by tuning of the hyperparameters of the third unsupervised machine learning model.

Therefore, the systems and techniques described herein provide enhanced methods for training unsupervised machine learning models, and improve accuracy and performance of computing systems implementing the unsupervised machine learning models.

Example Processing System

Figure 5:
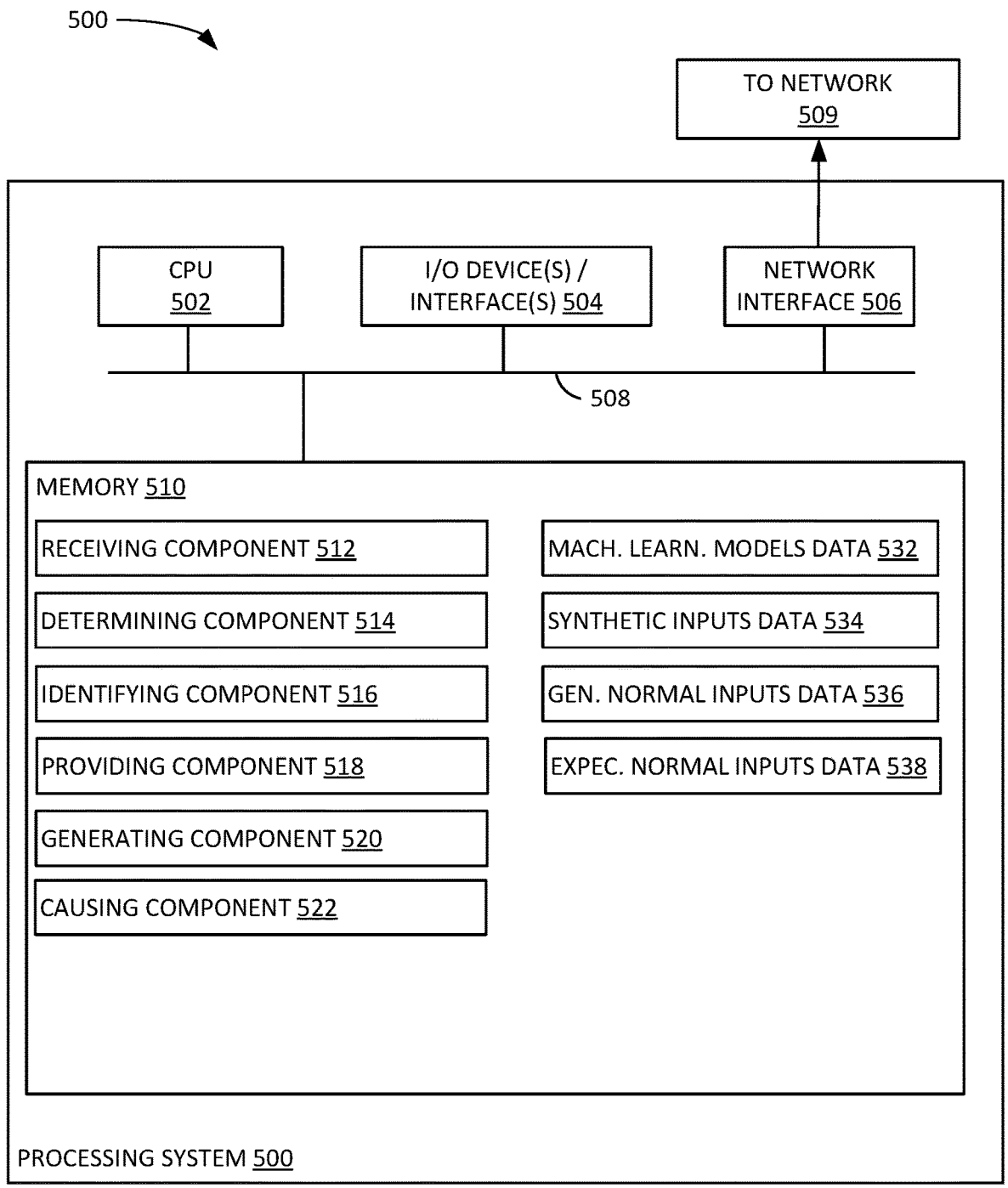
FIG. 5 depicts an example processing system configured to perform methods for generalized metric for machine learning model evaluation for unsupervised classification, in accordance with certain embodiments of the present disclosure.

FIG. 5 depicts an exemplary processing system 500 configured to perform methods for evaluating unsupervised machine learning models.

Processing system 500 includes a CPU 502 connected to a data bus 508. CPU 502 is configured to process computer-executable instructions, e.g., stored in memory 510 and to cause processing system 500 to perform methods as described herein, for example with respect to FIGS. 1 and 2. CPU 502 is included to be representative of a single CPU, multiple CPUs, a single CPU having multiple processing cores, and other forms of processing architecture capable of executing computer-executable instructions.

Processing system 500 further includes input/output devices and interface 504, which allows processing system 500 to interface with input/output devices, such as, for example, keyboards, displays, mouse devices, pen input, touch sensitive input devices, cameras, microphones, and other devices that allow for interaction with processing system 500. Note that while not depicted with independent external I/O devices, processing system 500 may connect with external I/O devices through physical and wireless connections (e.g., an external display device).

Processing system 500 further includes network interface 506, which provides processing system 500 with access to external computing devices, such as via network 509.

Processing system 500 further includes memory 510, which in this example includes various components configured to perform the functions described herein. In this implementation, memory 510 includes receiving component 512, determining component 514, identifying component 516, providing component 518, generating component 520, and causing component 522. These various components may, for example, comprise computer-executable instructions configured to perform the various functions described herein.

Processing system 500 further includes machine learning models data 532, which may be data related to the received unsupervised machine learning models described above with respect to FIGS. 1-4. Memory 510 also includes synthetic inputs data 534, which may be data related to the synthetic inputs described above with respect to FIGS. 1-4. Memory 510 also generated normal inputs data 536, which may be data related to the generated normal inputs described above with respect to FIGS. 1-4. Memory 510 also includes expected normal inputs data 538, which may data related to the expected normal inputs described above with respect to FIGS. 1-4. While not depicted in FIG. 5, other aspects may be included in memory 510.

Note that while shown as a single memory 510 in FIG. 5 for simplicity, the various aspects stored in memory 510 may be stored in different physical memories, but all accessible CPU 502 via internal data connections, such as bus 512. For example, some components of memory 510 may be locally resident on processing system 500, while others may be performed on remote processing systems or in cloud-based processing systems in other embodiments. This is just one example.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f)

unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
for each unsupervised machine learning model of a plurality of unsupervised machine learning models:
generating, by a computing device comprising one or more processors, a first set of synthetic inputs for the unsupervised machine learning model of the plurality of unsupervised machine learning models;
providing, by the computing device, the first set of synthetic inputs to the unsupervised machine learning model trained to output a prediction for each input of the first set of synthetic inputs, wherein the prediction indicates whether the input is of a first class of a plurality of classes;
identifying, by the computing device, based on an output of the unsupervised machine learning model, a second set of synthetic inputs predicted to be of the first class;
determining by the computing device, based on a set of expected normal inputs for the unsupervised machine learning model and the second set of synthetic inputs, an accuracy score for the unsupervised machine learning model; and
providing, by the computing device, the accuracy score for display via a display device to a requestor;
selecting, by the computing device, based on the corresponding accuracy scores of the plurality of unsupervised machine learning models, a particular unsupervised machine learning model of the plurality of unsupervised machine learning models for deployment into a production environment; and
deploying, by the computing device, based on the selecting, the particular unsupervised machine learning model into the production environment, wherein a software application in the production environment uses the particular unsupervised machine learning model to generate one or more predictions.

2. The method of claim 1, wherein determining the accuracy score comprises:
determining, based on the set of expected normal inputs and the second set of synthetic inputs, an area of overlap between the set of expected normal inputs and the second set of synthetic inputs.

3. The method of claim 2, wherein determining the accuracy score comprises:
determining, based on the set of expected normal inputs and the second set of synthetic inputs, an area of union between the set of expected normal inputs and the second set of synthetic inputs.

4. The method of claim 3, wherein determining the accuracy score comprises:
determining a number of unique common inputs between the set of expected normal inputs and the second set of synthetic inputs; and
determining a total number of unique common inputs between the set of expected normal inputs and the second set of synthetic inputs.

5. The method of claim 1, wherein the second set of synthetic inputs are a subset of the first set of synthetic inputs.

6. The method of claim 1, wherein the accuracy score of the particular unsupervised machine learning model is greater than the corresponding accuracy scores of other unsupervised machine learning models of the plurality of unsupervised machine learning models.

7. The method of claim 1, wherein the set of expected normal inputs are received from the requestor.

8. The method of claim 1, wherein the plurality of unsupervised machine learning models are received from the requestor.

9. A processing system, comprising:
a memory comprising computer-executable instructions;
a processor configured to execute the computer-executable instructions and cause the processing system to:
for each unsupervised machine learning model of a plurality of unsupervised machine learning models:
generate a first set of synthetic inputs for the unsupervised machine learning model of the plurality of unsupervised machine learning models;
provide the first set of synthetic inputs to the unsupervised machine learning model trained to output a prediction for each input of the first set of synthetic inputs, wherein the prediction indicates whether the input is of a first class of a plurality of classes;
identify, based on an output of the unsupervised machine learning model, a second set of synthetic inputs predicted to be of the first class;
determine, based on a set of expected normal inputs for the unsupervised machine learning model and the second set of synthetic inputs, an accuracy score for the unsupervised machine learning model; and
provide the accuracy score for display on a display device to a requestor;
select, based on the corresponding accuracy scores of the plurality of unsupervised machine learning models, a particular unsupervised machine learning model of the plurality of unsupervised machine learning models for deployment into a production environment; and
deploy, based on the selecting, the particular unsupervised machine learning model into the production environment, wherein a software application in the production environment uses the particular unsupervised machine learning model to generate one or more predictions.

10. The processing system of claim 9, wherein to determine the accuracy score comprises:
determine, based on the set of expected normal inputs and the second set of synthetic inputs, an area of overlap between the set of expected normal inputs and the second set of synthetic inputs.

11. The processing system of claim 10, wherein to determine the accuracy score comprises:
determine, based on the set of expected normal inputs and the second set of synthetic inputs, an area of union between the set of expected normal inputs and the second set of synthetic inputs.

12. The processing system of claim 11, wherein to determine the accuracy score comprises:

determine a number of unique common inputs between the set of expected normal inputs and the second set of synthetic inputs; and determine a total number of unique common inputs between the set of expected normal inputs and the second set of synthetic inputs.

13. The processing system of claim 10, wherein the second set of synthetic inputs are a subset of the first set of synthetic inputs.

14. The processing system of claim 9, wherein the accuracy score of the particular unsupervised machine learning model is greater than the corresponding accuracy scores of other unsupervised machine learning models of the plurality of unsupervised machine learning models.

* * * * *

UNITED STATES PATENT AND TRADEMARK OFFICE
CERTIFICATE OF CORRECTION

| | |
|---|---|
| PATENT NO. | : 11,620,579 B2 |
| APPLICATION NO. | : 16/925218 |
| DATED | : April 4, 2023 |
| INVENTOR(S) | : Prajwal Prakash Vasisht and Nishanth Dara |

It is certified that error appears in the above-identified patent and that said Letters Patent is hereby corrected as shown below:

On the Title Page

Item (12), should read as follows:
Rajamurthy et al.

Item (72), Inventors should read as follows:
Sharath Rajamurthy Sunnyvale CA (US)
Prajwal Prakash Vasisht San Jose CA (US)
Nishanth Dara Mountain View CA (US)

Signed and Sealed this
Fourth Day of July, 2023

Katherine Kelly Vidal
*Director of the United States Patent and Trademark Office*